United States Patent [19]
Wheeler

[11] 3,982,520
[45] Sept. 28, 1976

[54] OIL FILTER MOUNTING MEANS
[76] Inventor: Bill L. Wheeler, P.O. Box 5, Cone, Tex. 79321
[22] Filed: Aug. 14, 1975
[21] Appl. No.: 606,203

[52] U.S. Cl. .......................... 123/196 A; 210/444; 210/418; 210/420; 184/6.24
[51] Int. Cl.² ..................... F01M 1/10; B01D 29/00
[58] Field of Search ................. 210/444, 418, 420; 123/196 R, 196 A; 184/6.21, 6.24; 137/544

[56]  References Cited
UNITED STATES PATENTS

| | | | |
|---|---|---|---|
| 1,062,236 | 5/1913 | Hitchcock | 210/420 |
| 1,981,397 | 11/1934 | Tabozzi | 210/444 |
| 3,087,582 | 4/1963 | Poher | 184/6.24 |

Primary Examiner—Ronald H. Lazarus
Attorney, Agent, or Firm—Mason, Fenwick & Lawrence

[57] ABSTRACT

An oil filter mounting means for an internal combustion engine has an engine engaging end dimensioned and shaped to be mounted on an engine fitting on which an oil filter is normally mounted and has an opposite end with a threaded nipple for receiving an oil filter with first and second conduits extending through the fitting member and a valve means for opening or closing the conduits to permit flow of oil through the filter or to block the flow of oil to permit the filter to be changed without interruption of the operation of the engine.

7 Claims, 4 Drawing Figures

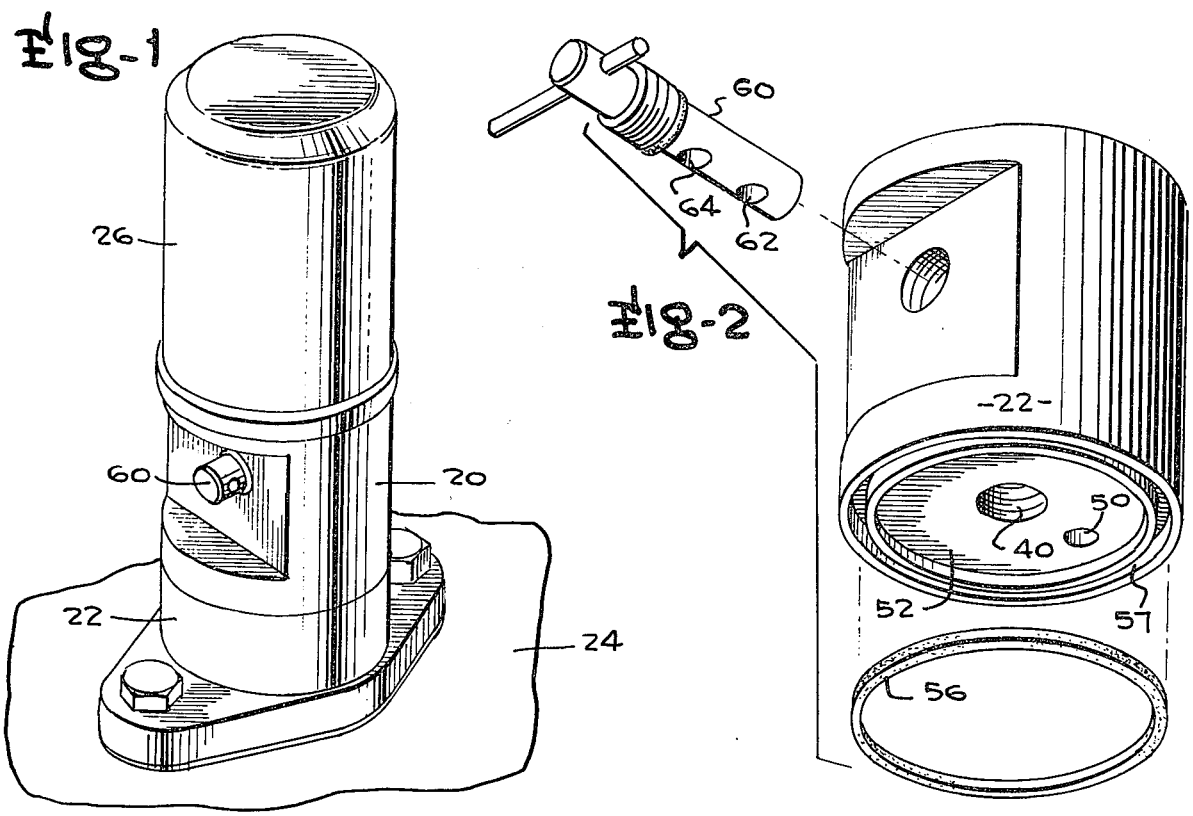
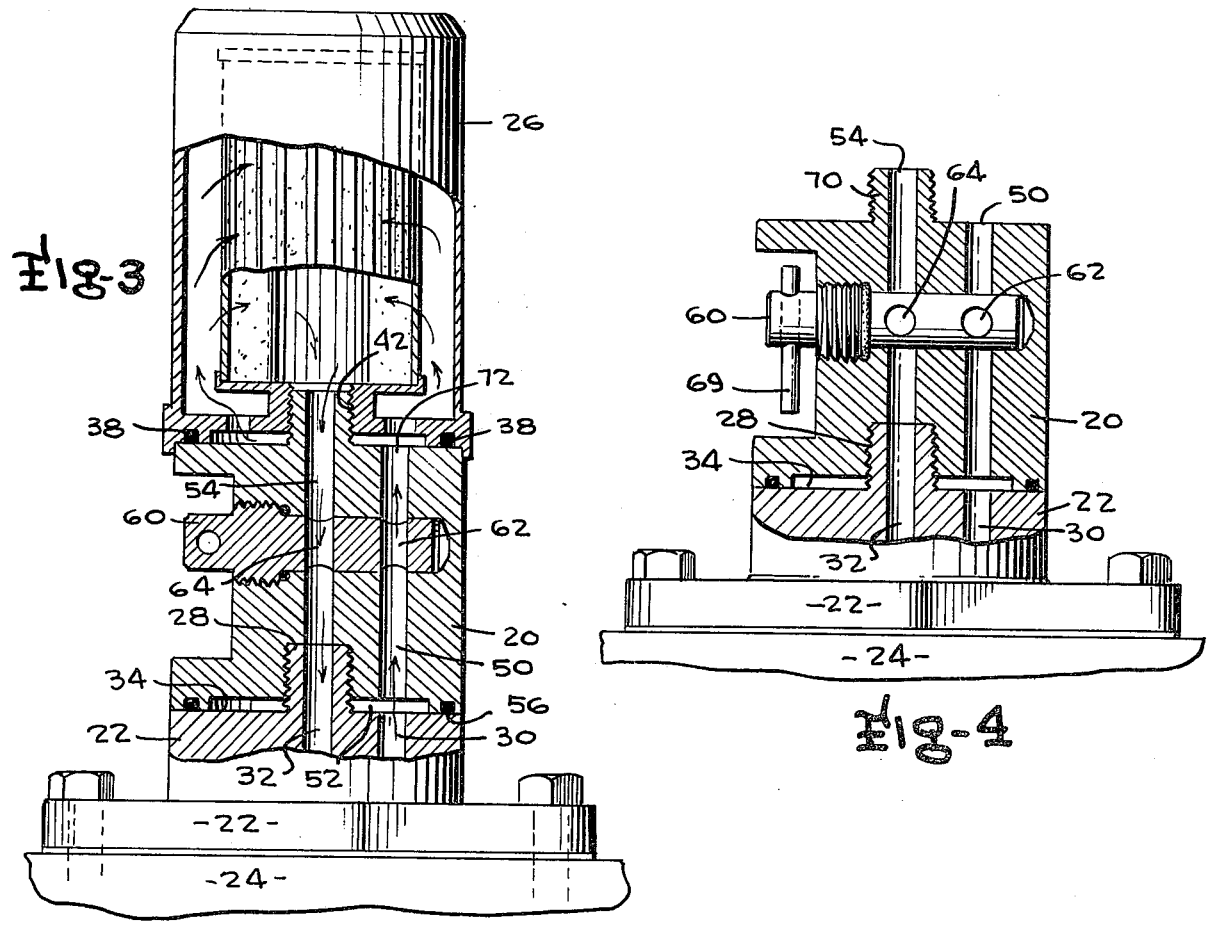

OIL FILTER MOUNTING MEANS

This invention is in the field of internal combustion engine accessories and is more specifically directed to means for mounting a self-contained cartridge type oil filter on an internal combustion engine and including means for permitting the changing of the filter without interruption of the engine operation.

Cartridge type oil filters have been employed on gasoline and diesel internal combustion engines in automobiles, trucks and the like for many years. Such filters are mounted by simply engaging a threaded recess in the base end of the filter cartridge with a threaded male nipple of an engine fitting with rotation of the cartridge bringing the base of the cartridge which includes a ring seal into forceful engagement with a planar surface of the fitting so that the seal means carried by the end of the cartridge provides a sealed engagement with the engine fitting. The changing of oil filters mounted on the engine of vehicles in the foregoing manner is a relatively simple reverse process easily accomplished while the engine is not being operated. However, internal combustion engines of the type employed for driving pumps for water supply systems or in the petroleum industry and other twenty-four hour operations are employed in operations in which the deactivation of the engine can be undesirable and costly for several obvious reasons. Consequently, oil filters employed on such engines frequently do not get changed as often as is desirable due to the inconveniences and costs of engine shut-down to the obvious resultant detriment of the engine.

Therefore, it is the primary object of this invention to provide a new and improved oil filter mounting means which will permit changing of the oil filter without the need for shut-down of the engine on which the filter is mounted.

Achievement of the object of this invention is enabled by the preferred embodiment which consists of an adaptor member having a base end dimensioned and shaped essentially the same as the base end of a conventional oil filter cartridge and including a cylindrical threaded recess threadably engageable with the male nipple of an engine fitting to which such cartridges are normally mounted. The adaptor member includes an outer end having a threaded nipple the same size and shape as the threaded nipple of the engine fitting and to which an oil filter cartridge can be mounted. First and second conduits extend through the adaptor member to provide communication between the oil outflow opening of the engine fitting and an inflow opening on a filter cartridge and a return opening of the cartridge to a return opening of the engine fitting so that engine operation results in flow of oil through the filter, filtration of the oil in the fitting and return of the filtered oil to the engine sump. A manually operable valve member including a rotary valve stem is provided in the adaptor member and includes diametric passageways aligned with the first and second conduits during a filtering operation but movable to a second or closed position in which the first and second conduits are blocked so that the cartridge can be changed while the engine continues to operate. Upon completion of the change of a cartridge, the valve member is then moved to place the passageways in the rotary valve stem in alignment with the first and second conduits of the fitting to resume filtration of the engine oil.

The manner in which the preferred embodiment of the invention achieves the object of the invention will be better understood when the following written description is considered in conjunction with the appended drawings in which:

FIG. 1 is a perspective view of the preferred embodiment mounted on an internal combustion engine and provided with an oil filter cartridge in operative position;

FIG. 2 is an exploded perspective view looking upwardly from the base end of the preferred embodiment;

FIG. 3 is a side elevation partially in section of the preferred embodiment and the oil filter cartridge and a portion of the fitting with the valve means in open condition; and FIG. 4 is a bisecting sectional view of the preferred embodiment illustrating the valving means in a closed position for permitting the changing of the filter cartridge.

Attention is initially invited to FIG. 1 of the drawings which illustrates the preferred embodiment consisting of an adaptor member broadly designated 20 which is mounted on an engine fitting 22 of an internal combustion engine, a portion of which 24 is illustrated. It should be understood that the position and orientation of the fitting 22 on the engine will vary with different types and makes of engines and the dimensions of the fitting will vary in accordance with the dimensions of the engine fitting. An oil filter cartridge 26 is mounted on the end of the adaptor member 20 opposite the end connected to the engine fitting 22.

Engine fitting 22 includes an upwardly extending threaded nipple 28 and an oil outflow conduit 30 and an oil return conduit 32 as best illustrated in FIGS. 3 and 4. It should be understood that the directions "upwardly" etc. referred to the orientation of the parts as illustrated in the drawings and are not necessarily the actual orientation as will occur when the device is mounted in the field. The outer end of the engine fitting 22 includes a planar surface 34 against which a sealing ring 38 on the base end of a filter cartridge 26 would be normally engaged if the fitting was not being employed.

Adaptor member 20 is provided on its base end with a cylindrical threaded recess 40 of the same size and shape as the cylindrical threaded recess 42 of the cartridge 26 so that the adaptor member can be threadably mounted on the threaded nipple 28 of the engine fitting in an obvious manner. A first conduit 50 extends through the adaptor member 20 and has its base end engageable with a cylindrical recess 52 of the adaptor member. Cylindrical recess 52 communicates with the oil outflow conduit 30 of the engine fitting so that oil flowing from the conduit 30 enters the cylindrical recess 52 and then flows into the first conduit 50. A second conduit 54 extends through the member 20 and has its base end in communication with the oil return conduit 32 of the engine fitting to permit the return of engine oil to the engine as illustrated in FIG. 3. A ring-type seal member 56 of the same shape and dimensions as the seal member 38 of a conventional cartridge is provided in an annular recess 57 in the base end of the adaptor member so that tightened engagement of the adaptor member effected by rotation of the adaptor member and interaction of the threads on nipple 28 and cylindrical recess 40 results in a sealing of the adaptor to the engine fitting in the same manner as an oil filter cartridge would have been connected to the engine fitting in the absence of the adaptor member.

Valving means consisting of a rotary valve stem 60 is provided in the adaptor member 20 with the valve stem 60 including first and second diametrically extending passageways 62 and 64 respectively alignable with the first and second conduits 50 and 54 of the adaptor member. When the valve member 60 is positioned by rotation of a thumb lever 69 as shown in FIG. 3 with the passageways 62, 64 in alignment with conduits 52, 54, flow of oil to and from the cartridge 26 is permitted. The outer end of the adaptor member includes a cylindrical nipple 70 threaded on its outer periphery and dimensioned the same as the dimensions of the engine fitting 28 so as to permit threaded connection of the base end of the filter member to the adaptor. However, a differently sized and shaped cartridge mounting fitting can be employed if it is desired to use a different cartridge from that originally intended to be mounted on fitting 22. The sealing ring 38 of the fitting member engages the flat planar outer surface 72 of the adaptor member to provide sealed engagement of the cartridge on the adaptor member.

Normally, the device operates in the manner illustrated in FIG. 3 with the engine oil flowing outwardly through the first conduit 50 into the cartridge 26 and returning via the second conduit 54 to the oil return conduit 32 of the engine fitting 22. However, when it is desired to change the cartridge, the rotary valve stem 60 is moved to the position illustrated in FIG. 4 in which the passageways 62 and 64 do not communicate with the first and second conduits 30 and 32 so that the first and second conduits are blocked in an obvious manner. Consequently, oil cannot flow outwardly through the conduit 30 and the cartridge is isolated from the oil flow. The cartridge is then removed and replaced and the valve member returned to its position illustrated in FIG. 3 to resume the filtering operation. Obviously, changing of the filter does not require any deactivation or shut-down of the engine.

While the preferred embodiment of the invention has been illustrated herein, it should be understood that the spirit and scope of the invention is to be limited solely by the appended claims since obvious modification of the preferred embodiment will undoubtedly occur to those of skill in the art.

I claim:

1. An internal combustion engine including an oil filter mounting means for permitting a filter change without interruption of engine operation said oil filter mounting means comprising an adaptor member including adaptor mounting means engageable with the oil filter mounting engine fitting of the internal combustion engine to permit said adaptor to be mounted thereon, oil filter mounting adaptor fitting means on said adaptor means for permitting an oil filter to be mounted on said adaptor means, first conduit means extending through said adaptor means for providing communication between an oil outflow opening of said engine fitting and an inflow opening of an oil filter mounted on said adaptor fitting, second conduit means extending through said adaptor member for providing communication between an oil return opening of said engine fitting and an outflow opening of said oil filter mounted on said adaptor fitting and selectively operable valve means for closing said first and second conduit means to permit the changing of an oil filter member without interruption of engine operation.

2. The invention of claim 1 wherein said adaptor mounting means includes a threaded recess on one end of said adaptor member dimensioned to matingly engage a threaded nipple of said engine fitting.

3. The invention of claim 1 wherein said valve means comprises a rotary valve stem having first and second diametric passageways alignable with said first and second conduits when in an open position for permitting flow of oil through said first conduit to an oil filter mounted on said adaptor fitting with return flow through the second conduit and wherein said adaptor mounting means includes a cylindrical threaded recess on one end of said adaptor member dimensioned to threadably engage a threaded nipple of said engine fitting.

4. The invention of claim 1 wherein said adaptor mounting means includes a threaded cylindrical recess on one end of said adaptor member dimensioned to be threadably mounted on a threaded nipple of said engine fitting, said adaptor fitting means comprises a cylindrical nipple on an opposite end of said adaptor member dimensioned to be threadably received in a threaded recess on the end of an oil filter mounted thereon and said valve means comprises a rotary valve stem having first and second passageways alignable with said first and second conduits for permitting the flow of oil to and from said oil filter.

5. The invention of claim 1 additionally including seal means between said engine fitting and said adaptor member enclosing the juncture of said first and second conduits with said engine fitting, said adaptor mounting means including a threaded recess on one end of said adaptor member within the enclosure provided by said seal means to matingly engage a threaded nipple of said engine fitting, said first conduit communicating with the inner end of said threaded recess, said valve means including a rotary valve stem having first and second diametric passageways respectively alignable with said first and second conduits and wherein said adaptor fitting means comprises a cylindrical threaded nipple dimensioned to be threadably engaged with a cylindrical threaded recess of an oil filter member.

6. The invention of claim 1 wherein said adaptor fitting means includes a cylindrical nipple on one end having a threaded outer surface dimensioned to be threadably engaged with a cylindrical threaded recess of an oil filter, said adaptor mounting means including a threaded recess on an opposite end of said adaptor member dimensioned to matingly engage a threaded nipple of said engine fitting.

7. The invention of claim 5 wherein the outer end of said adaptor member engageable with an oil filter is essentially of the same shape and dimensions as said engine fitting.

* * * * *